(12) United States Patent  
Kowaczyk et al.

(10) Patent No.: US 12,172,699 B2  
(45) Date of Patent: Dec. 24, 2024

(54) HINGE ASSEMBLY FOR VEHICLE HOOD

(71) Applicant: NISSAN NORTH AMERICA, INC., Franklin, TN (US)

(72) Inventors: Michael Kowaczyk, Waterford, MI (US); Nicholas Bulski, Berkley, MI (US)

(73) Assignee: Nissan North America, Inc., Franklin, TN (US)

( * ) Notice: Subject to any disclaimer, the term of this patent is extended or adjusted under 35 U.S.C. 154(b) by 180 days.

(21) Appl. No.: 17/698,914

(22) Filed: Mar. 18, 2022

(65) Prior Publication Data

US 2023/0294774 A1  Sep. 21, 2023

(51) Int. Cl.
*B62D 25/12* (2006.01)
*E05D 3/02* (2006.01)
*E05D 13/00* (2006.01)

(52) U.S. Cl.
CPC .............. *B62D 25/12* (2013.01); *E05D 3/02* (2013.01); *E05D 13/003* (2013.01); *E05Y 2900/536* (2013.01)

(58) Field of Classification Search
CPC ......... B62D 25/12; E05D 3/02; E05D 13/003; E05Y 2900/536
See application file for complete search history.

(56) References Cited

U.S. PATENT DOCUMENTS

| | | | | |
|---|---|---|---|---|
| 4,186,476 A * | 2/1980 | Mair | ............ | B62D 25/105 180/69.21 |
| 6,047,445 A * | 4/2000 | Mennen | ............ | E05D 11/06 16/374 |
| 6,513,617 B2 * | 2/2003 | Sasaki | ............ | B60R 21/38 296/187.05 |
| 6,554,093 B2 * | 4/2003 | Sasaki | ............ | B60R 21/38 180/274 |
| 6,892,843 B2 * | 5/2005 | Schillaci | ............ | E05C 17/24 296/193.11 |
| 7,536,748 B2 * | 5/2009 | Renke | ............ | E05F 1/1276 16/289 |
| 7,802,345 B2 * | 9/2010 | Mathew | ............ | E05D 15/46 296/193.11 |
| 7,845,053 B2 * | 12/2010 | Marsh | ............ | E05F 1/1215 16/306 |
| 7,987,939 B2 * | 8/2011 | Kisiler | ............ | B62D 25/105 180/69.2 |

(Continued)

FOREIGN PATENT DOCUMENTS

CN 208396519 U 1/2019
KR 20050025717 A 3/2005

*Primary Examiner* — Christine M Mills
*Assistant Examiner* — Matthew J Sullivan
(74) *Attorney, Agent, or Firm* — Global IP Counselors, LLP

(57) ABSTRACT

A hood hinge assembly for a vehicle hood includes a support bracket and a hinge arm. The support bracket is configured to be fixed to a vehicle body structure. The hinge arm is movably connected to the support bracket. The hinge arm is movable about a pivot axis between a first position in which the vehicle hood is closed and a second position in which the vehicle hood is fully open. A stop tab is connected to the support bracket. The stop tab prevents movement of the hinge arm beyond the second position.

20 Claims, 7 Drawing Sheets

(56) References Cited

U.S. PATENT DOCUMENTS

| | | | | |
|---|---|---|---|---|
| 8,398,125 B2* | 3/2013 | Takahashi | ............... | B60R 21/34 |
| | | | | 16/222 |
| 8,595,901 B1* | 12/2013 | Shaw | .................... | E05D 7/0045 |
| | | | | 296/193.11 |
| 8,905,465 B2* | 12/2014 | Landholm | .............. | B62D 25/12 |
| | | | | 296/193.11 |
| 9,551,175 B2* | 1/2017 | Labbe | ....................... | E05D 7/04 |
| 9,701,275 B2* | 7/2017 | Kim | ........................ | B60R 21/34 |
| 9,751,493 B2* | 9/2017 | Narita | .................... | B62D 25/12 |
| 9,764,711 B2* | 9/2017 | Narita | ....................... | E05F 3/16 |
| 9,821,755 B2* | 11/2017 | Farooq | ................... | B60R 21/38 |
| 10,239,484 B2* | 3/2019 | Hwang | ................... | E05D 3/145 |
| 10,697,217 B2* | 6/2020 | Sawada | ................... | E05D 5/043 |
| 11,421,458 B2* | 8/2022 | Kamada | .................. | E05D 3/145 |
| 11,427,258 B2* | 8/2022 | Kim | ....................... | B62D 25/105 |
| 11,572,724 B2* | 2/2023 | Steinbrecher | ........... | E05D 5/062 |
| 2010/0005628 A1* | 1/2010 | Jung | ...................... | B62D 25/12 |
| | | | | 296/193.11 |
| 2023/0257024 A1* | 8/2023 | Otani | ................... | B62D 25/084 |
| | | | | 296/193.11 |
| 2023/0294774 A1* | 9/2023 | Kowaczyk | ........... | B62D 25/105 |
| | | | | 16/374 |
| 2023/0294775 A1* | 9/2023 | Sasaki | ..................... | E05C 17/52 |
| | | | | 180/69.21 |
| 2023/0340805 A1* | 10/2023 | Choi | .................. | E05D 15/0621 |

* cited by examiner

HINGE ASSEMBLY FOR VEHICLE HOOD

BACKGROUND

Technical Field

The present disclosure generally relates to a hinge assembly for a vehicle hood. More specifically, the present disclosure relates to a hinge assembly including a support bracket having a stop tab that supports a fender and stops movement of a hinge arm.

Background Information

An existing hinge assembly for a hood of a vehicle includes a support bracket to which a hinge arm and a fender support are separately connected. The hinge arm includes a stop tab that contacts the support bracket to stop movement of the hinge arm when moving the hood to a fully open position. The stop tab is integrally formed with the hinge arm as a one-piece member, thereby resulting in a configuration of the hinge arm with reduced strength. The fender support, which is separately connected to the support bracket, supports the fender.

SUMMARY

A need exists for a hinge assembly for a vehicle hood in which a hinge bracket includes a stop tab to limit movement of the hinge arm. The stop tab further supports the fender.

In view of the state of the known technology, one aspect of the present disclosure is to provide a hood hinge assembly for a vehicle hood. The hood hinge assembly includes a support bracket and a hinge arm. The support bracket is configured to be fixed to a vehicle body structure. The hinge arm is movably connected to the support bracket. The hinge arm is movable about a pivot axis between a first position in which the vehicle hood is closed and a second position in which the vehicle hood is fully open. A stop tab is connected to the support bracket. The stop tab prevents movement of the hinge arm beyond the second position.

Another aspect of the present disclosure is to provide a hood assembly for a vehicle. The hood assembly includes a vehicle hood, a support bracket, a hinge arm, a stop tab, and a fender. The support bracket is configured to be fixed to a vehicle body structure. The hinge arm has a connecting portion movably connected to the support bracket and a mounting portion connected to the vehicle hood. The hinge arm is movable about a pivot axis between a first position in which the vehicle hood is closed and a second position in which the vehicle hood is fully open. The stop tab is connected to the support bracket. The stop tab prevents movement of the hinge arm beyond the second position. The fender is supported by the stop tab.

Also other objects, features, aspects and advantages of the disclosed hinge assembly for a vehicle hood will become apparent to those skilled in the art from the following detailed description, which, taken in conjunction with the annexed drawings, discloses exemplary embodiments of the hinge assembly for a vehicle hood.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
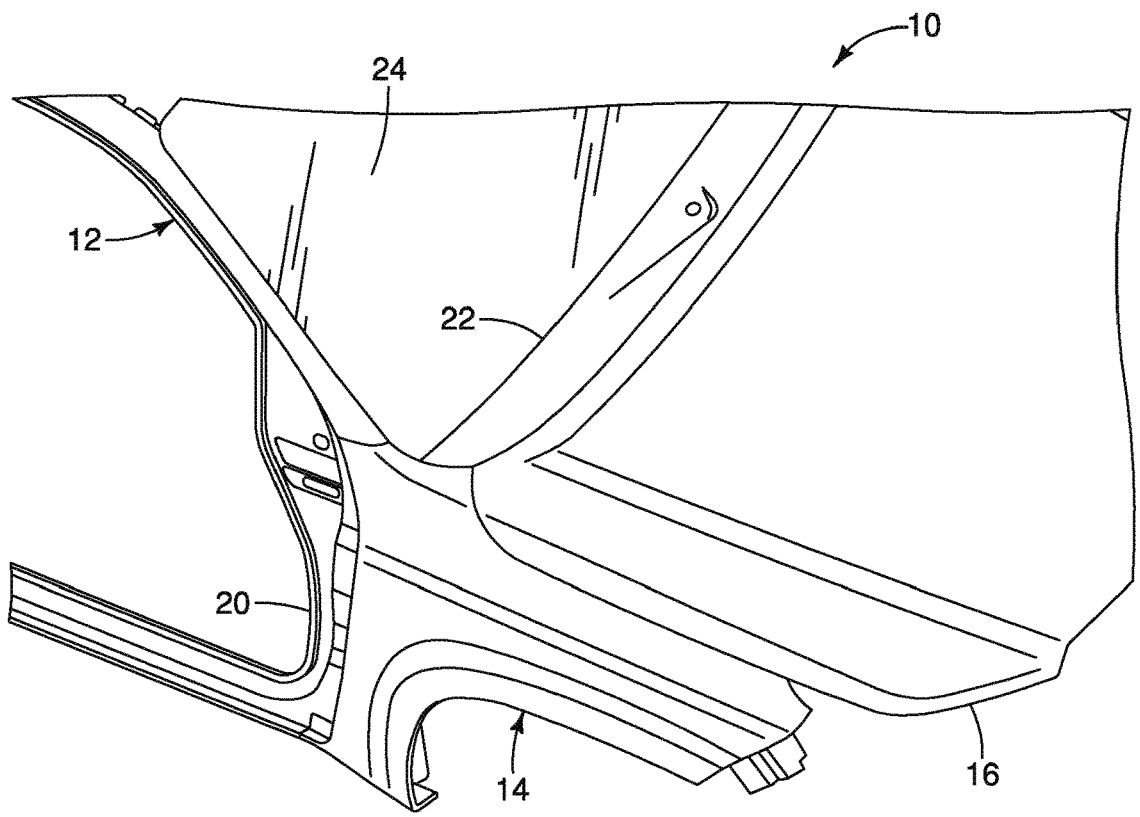
FIG. 1 is a perspective view of a vehicle including a hood and a fender.
Figure 2:
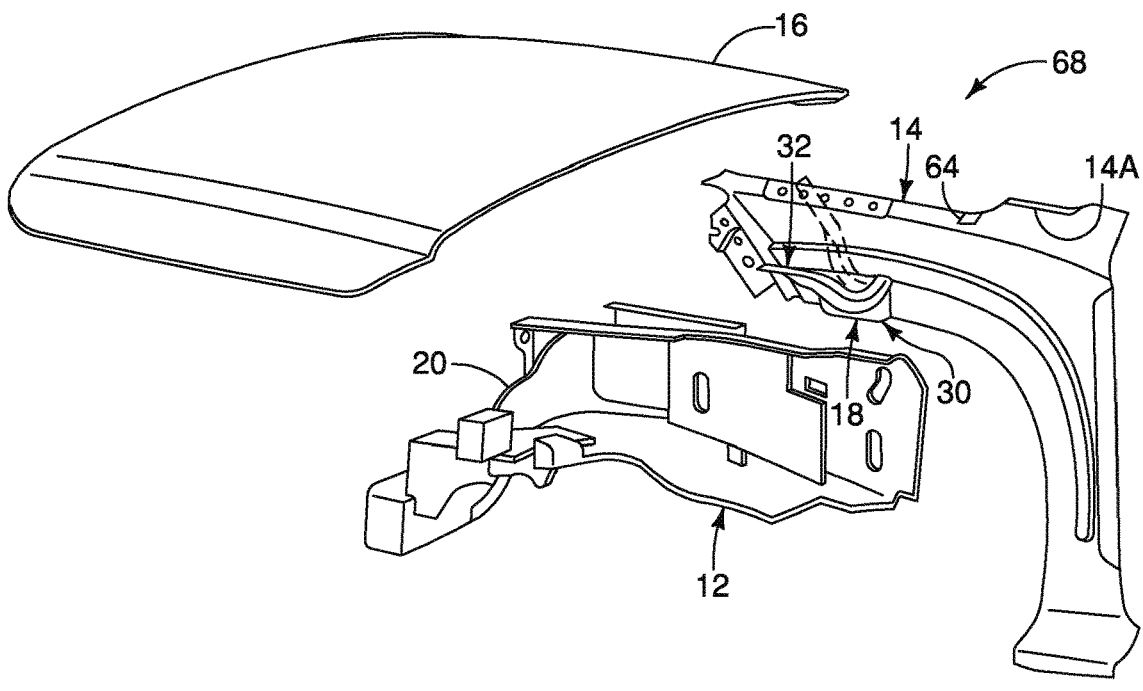
FIG. 2 is an exploded perspective view of the vehicle of FIG. 1 including a hinge assembly in accordance with an exemplary embodiment.
Figure 3:
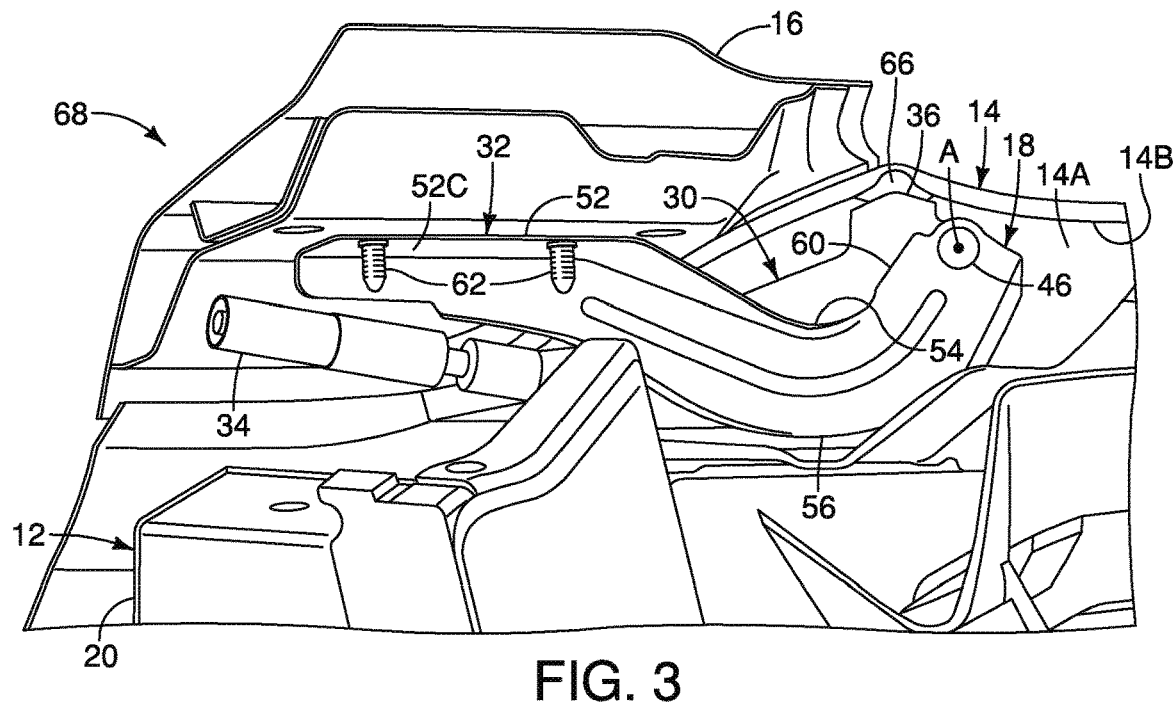
FIG. 3 is a perspective view of the hinge assembly of FIG. 2 in which the hood is in a closed position.
Figure 4:
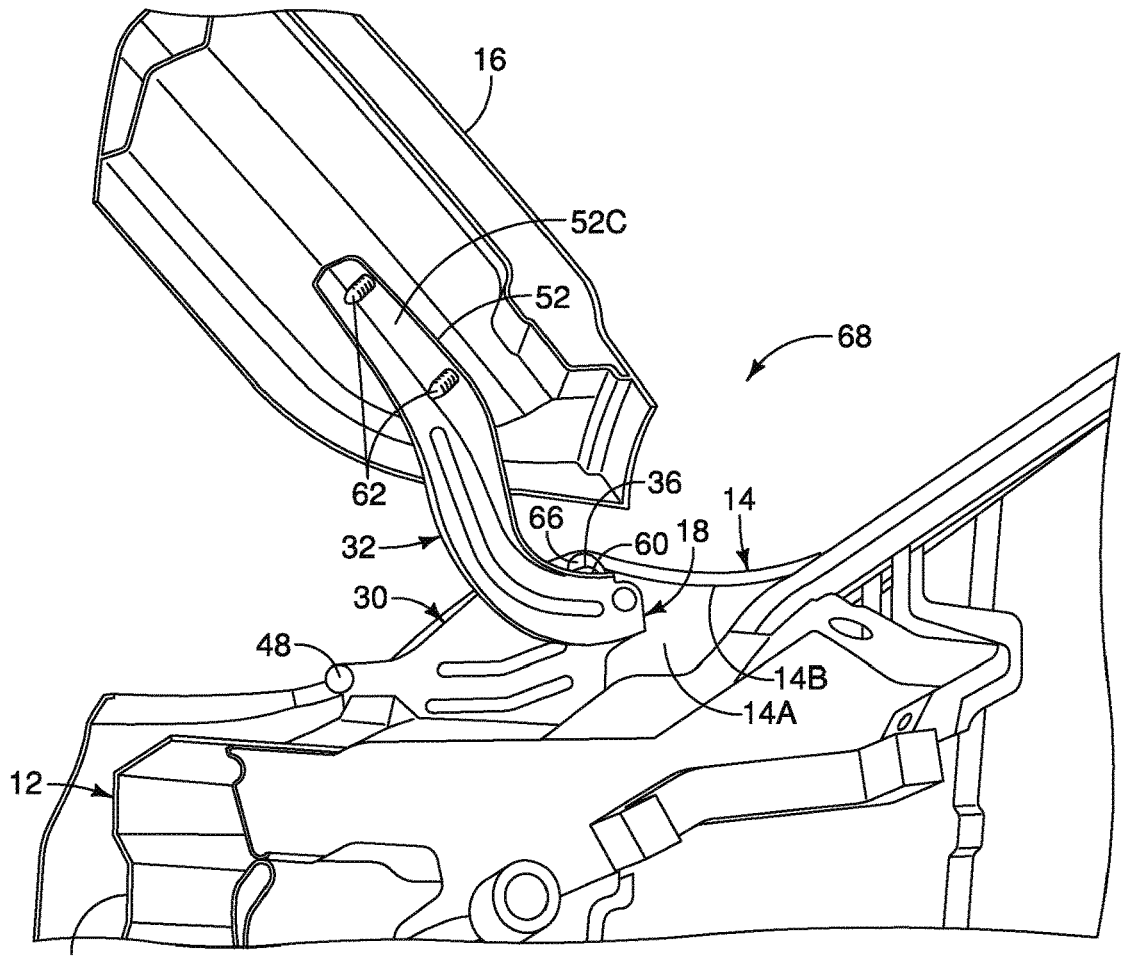
FIG. 4 is a perspective view of the hinge assembly of FIG. 2 in which the hood is in a fully open position.
Figure 5:
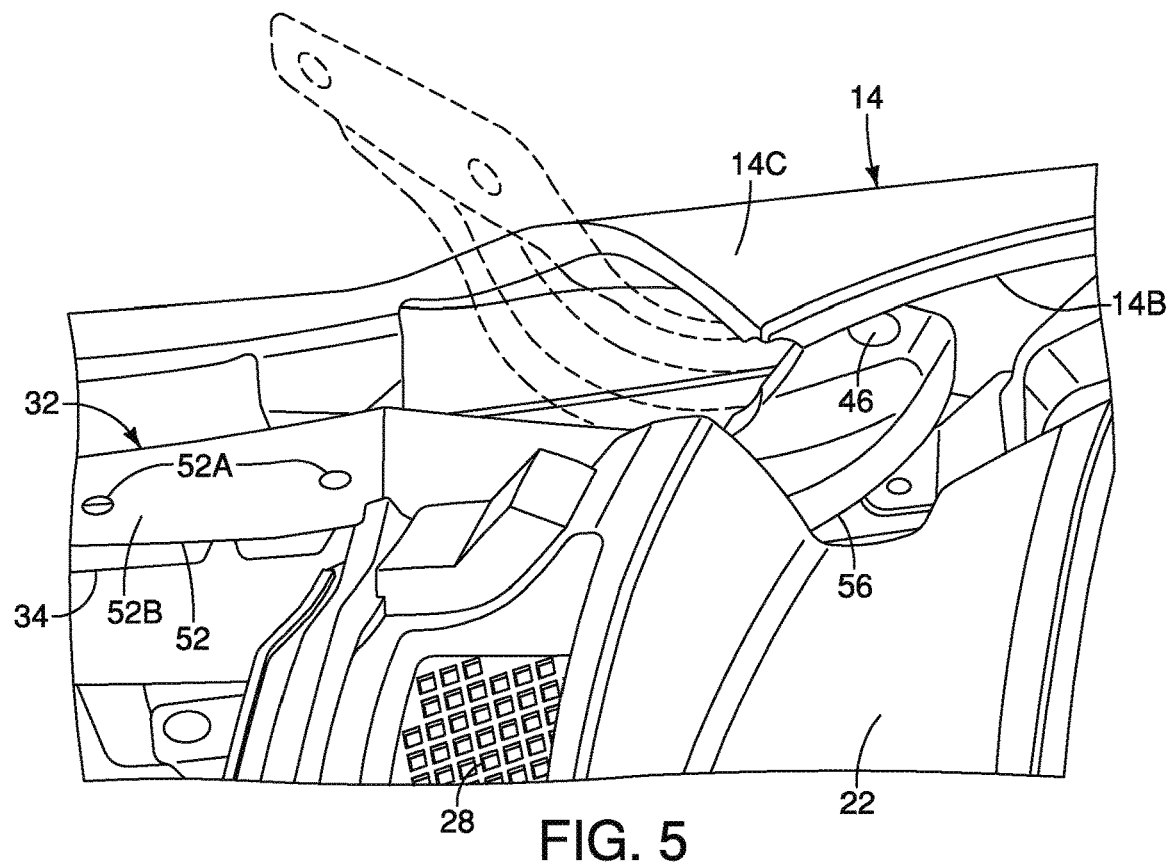
FIG. 5 is a perspective view of a fender supported by the hinge assembly of FIG. 2.
Figure 6:
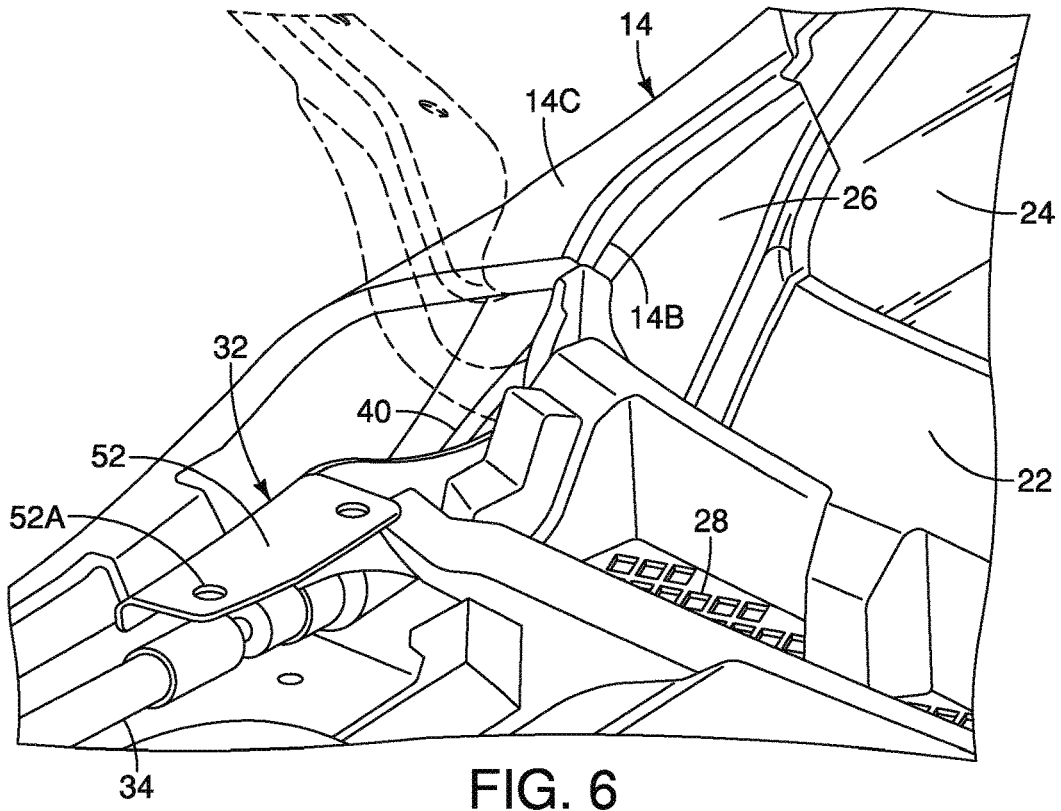
FIG. 6 is a side perspective view of the fender supported by the hinge assembly of FIG. 5.

Referring initially to FIGS. 1-9, a vehicle 10 is illustrated in accordance with an exemplary embodiment of the present invention. The vehicle 10 includes a vehicle body structure 12, a fender 14 connected to the vehicle body structure 12, and a hood 16. The hood 16 is movably connected to the vehicle body structure 12 by a hinge assembly 18. The hood 16 is movable between a first, or closed position, as shown in FIGS. 1 and 3, and a second, or open, position, as shown in FIG. 4. It will become apparent to those skilled in the art from the following detailed description that the hinge assembly of the present disclosure can be applied to any suitable type of vehicle, such as a pick-up truck.

As shown in FIGS. 1-9, the vehicle body structure 12 includes, among other things, a side panel 20. The side panel 20 is typically formed of one or more pieces of sheet metal or any other suitable material that are welded or rigidly and fixedly attached together to form a substantially rigid portion of the vehicle body structure 12. The side panel 20 can be further supported by other structural members, as needed and/or desired.

As shown in FIGS. 1-9, the vehicle 10 further includes a cowl 22, a windshield 24, and a cowl panel 26. The cowl 22 is disposed between the hood 16 and the windshield 24 in a longitudinal direction of the vehicle 10. The cowl 22 extends along a forward lower area of the windshield 24 in a lateral direction of the vehicle 10. The cowl 22 includes a screen 28 that substantially prevents leaves and other debris drawn in with outside air from passing through the cowl 22. The cowl 22 is fixed to the vehicle body structure 12 by fasteners (not shown) that hold the cowl 22 in place in a conventional manner. The windshield 24 is installed within a windshield opening defined by the vehicle body structure 12 in a conventional manner. A cowl panel 26 is disposed at each lateral end of the cowl 22.

The hood 16 is movably attached to the vehicle body structure 12 by the hinge assembly 18, as shown in FIGS. 1-9. The hinge assembly 18 includes a support bracket 30 and a hinge arm 32. The support bracket 30 is fixedly connected to the vehicle body structure 12 to support the hood 16. The hinge arm 32 is movably connected to the support bracket 30 to move the hood 16 between closed and open positions. A hood strut 34 is connected between the support bracket 30 and the hood 16 to further support the hood 16.

Figure 8:
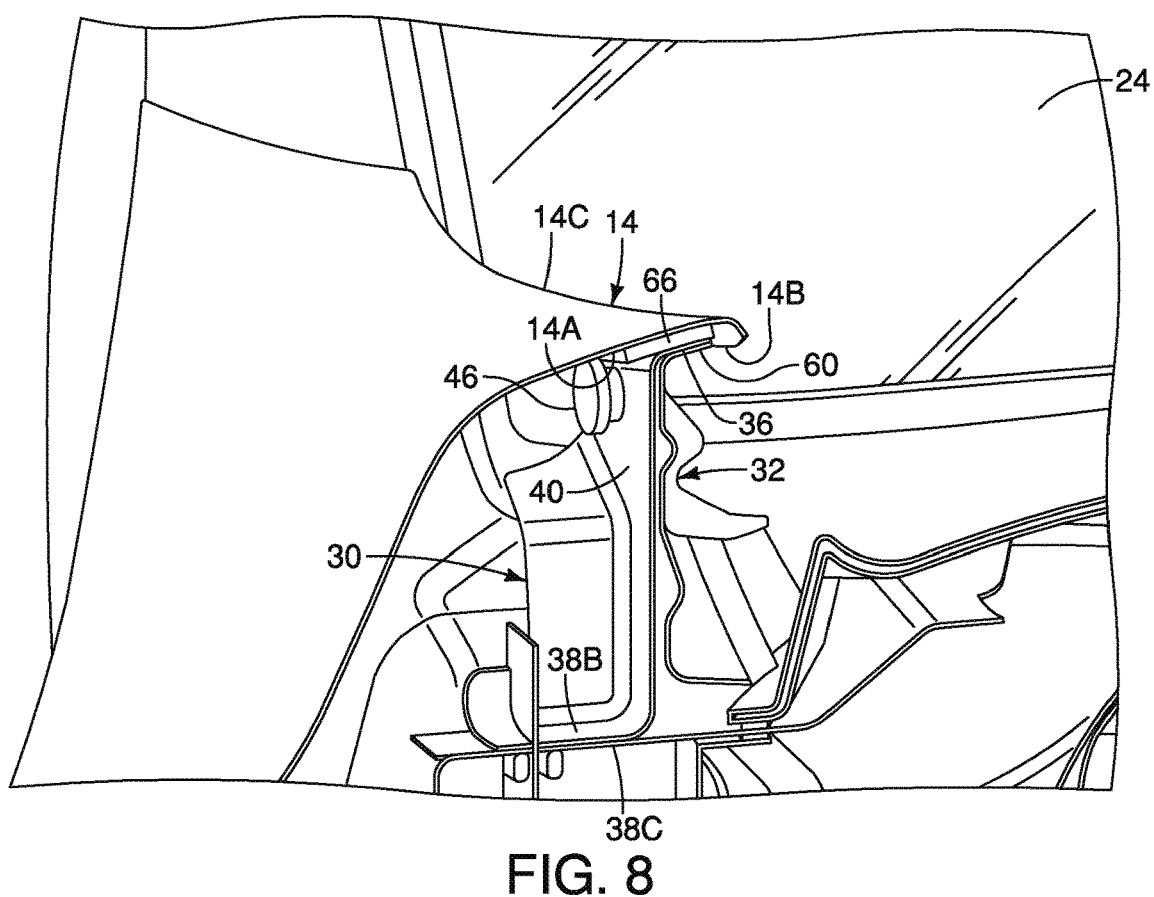
FIG. 8 is a perspective view in cross section of a stop tab of the support bracket of FIG. 2 supporting the fender.
Figure 9:
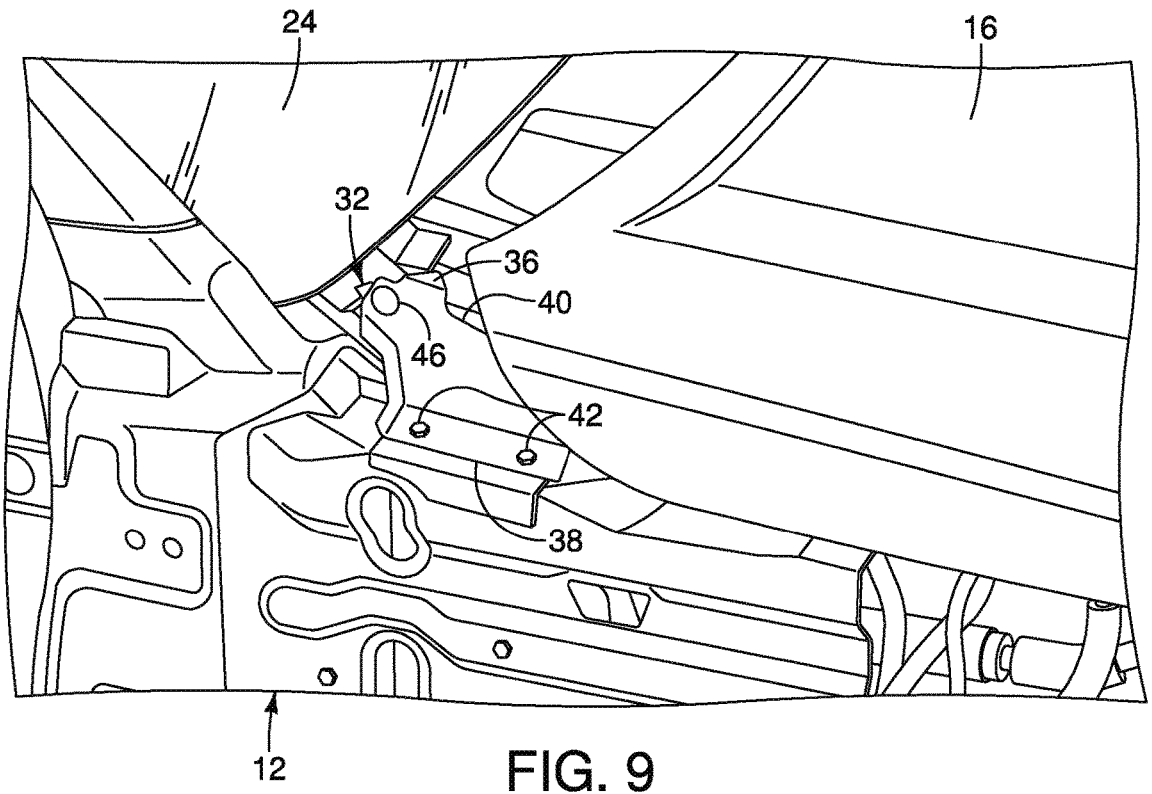
FIG. 9 is a perspective view of the support bracket of FIG. 2 connected to a vehicle body structure.

The hinge assembly 18 includes the support bracket 30 and the hinge arm 32, as shown in FIGS. 10-13. The support bracket 30 is configured to be secured to the vehicle body structure 12, as shown in FIG. 9. The hinge arm 32 is movably connected to the support bracket 30, as shown in FIGS. 2-7. The hinge arm 32 is movable about a pivot axis A between a first position, as shown in FIGS. 2, 3, 5-7 and 9, in which the hood 16 is in a closed position, or closed, and a second position, as shown in FIGS. 4 and 8, in which the hood 16 is in a fully opened position. The hinge arm 32 is shown in the second position in FIGS. 2 and 5-7 in dashed lines. A stop tab 36 is connected to the support bracket 30 to prevent movement of the hinge arm 32 beyond the second position.

Figure 10:
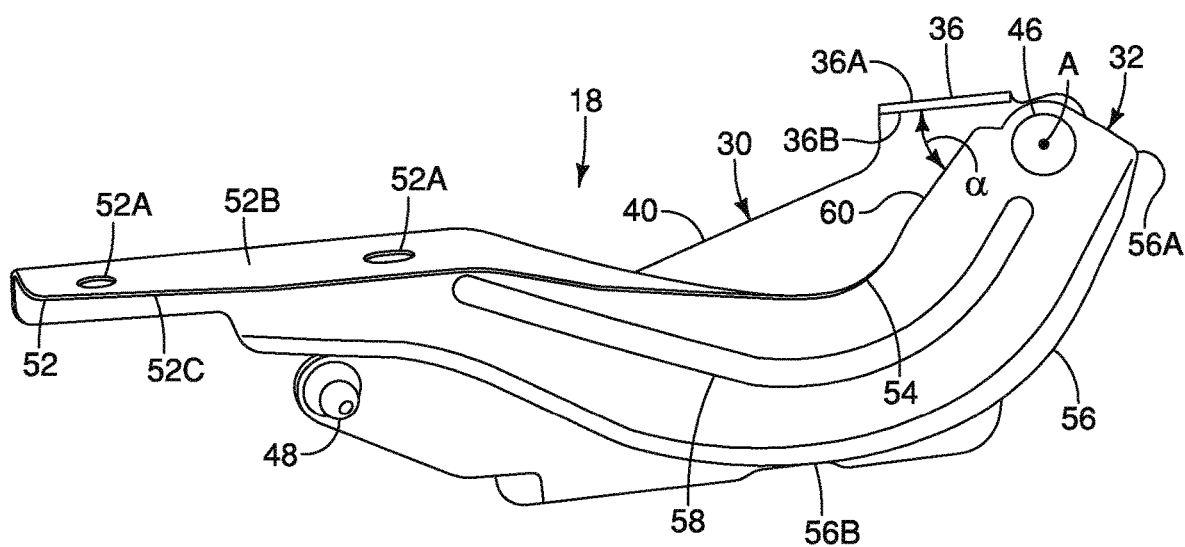
FIG. 10 is a side perspective view of the hinge assembly of FIG. 2.
Figure 11:
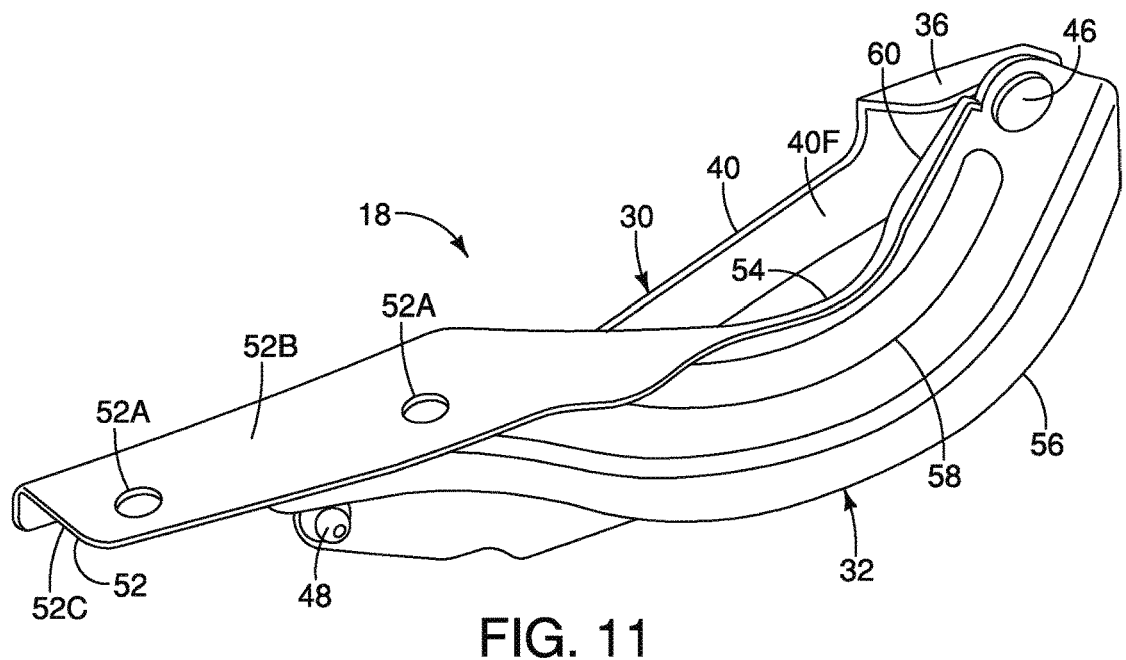
FIG. 11 is atop perspective view of the hinge assembly of FIG. 10.
Figure 12:
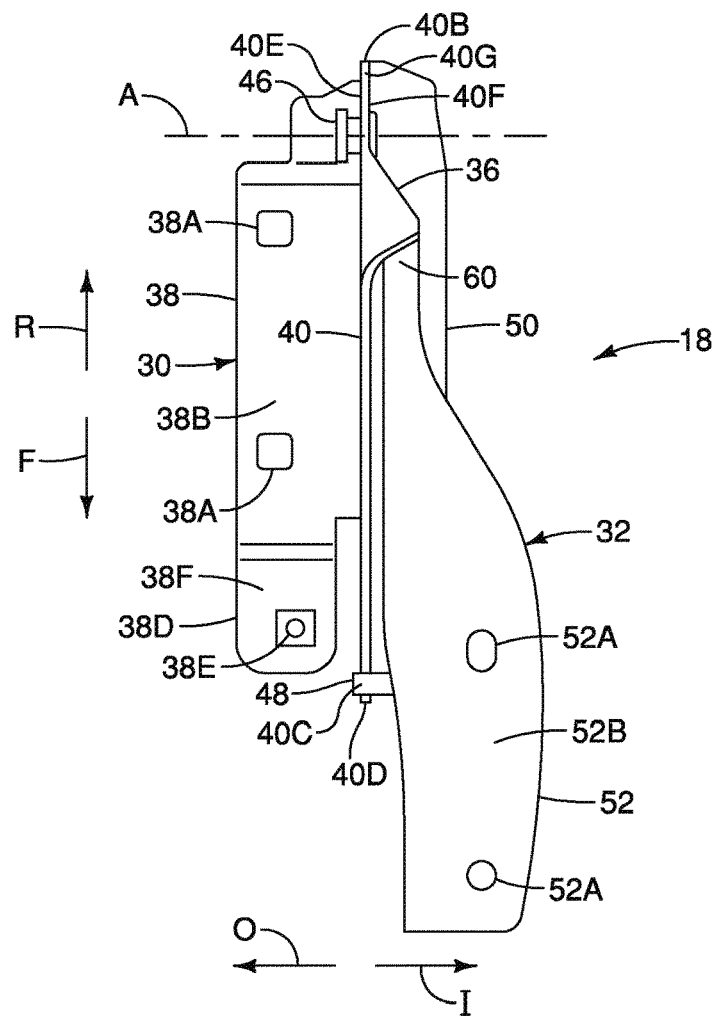
FIG. 12 is a top plan view of the hinge assembly of FIG. 10.

The support bracket 30 includes a mounting portion 38, a connection portion 40, and the stop tab 36, as shown in FIGS. 10-13. The support bracket 30 is preferably made of a metallic material, such as steel. The support bracket 30 is preferably unitarily formed as a one-piece member. A forward direction F and a rearward direction R when the hinge assembly 18 is installed in the vehicle 10 (FIG. 1) are illustrated in FIG. 12.

The mounting portion 38 of the support bracket 30 is includes a plurality of fastener holes 38A, as shown in FIGS. 8, 9, 12 and 13. The fastener holes 38A extend from an upper surface 38B of the mounting portion 38 to a lower surface 38C of the mounting portion 38. Although the mounting portion 38 is shown having two fastener holes 38A, the mounting portion 38 can have any suitable number of fastener holes 38A. Each fastener hole 38A is configured to receive a fastener 42 to secure the support bracket 30 to the vehicle body structure 12.

Figure 13:
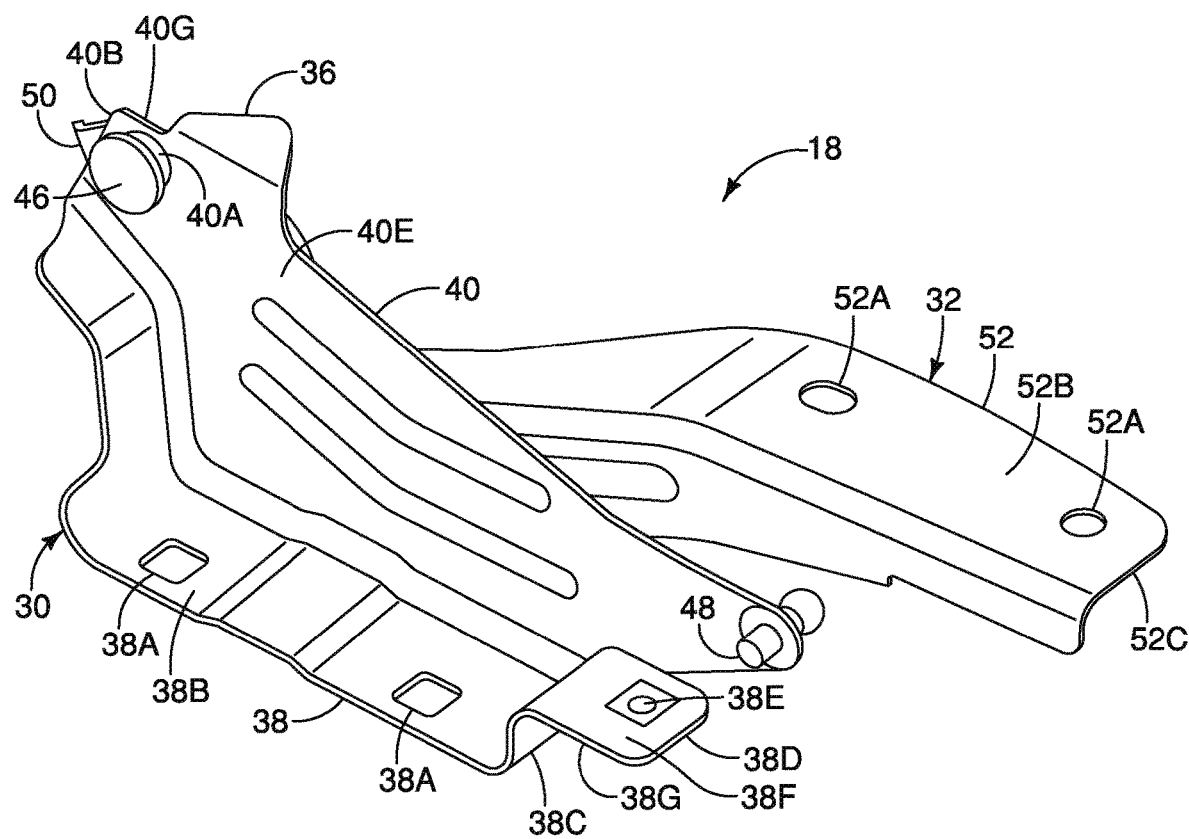
FIG. 13 is an opposite side perspective view of the hinge assembly of FIG. 10.

A mounting tab 38D is formed at a forward end of the mounting portion 38, as shown in FIGS. 12 and 13. The mounting tab 38D is substantially L-shaped. A fastener hole 38E is disposed in the mounting tab 38D and extends from an upper surface 38F to a lower surface 38G of the mounting tab 38D. Although the mounting tab 38D is shown having one fastener hole 38E, the mounting tab 38D can have any suitable number of fastener holes 38E. The fastener hole 38E is configured to receive a fastener 44 to secure the support bracket 30 to the fender 14.

The connecting portion 40 is connected to an inboard side of the mounting portion 38, as shown in FIGS. 12 and 13. The connecting portion 40 has a first fastener hole 40A disposed proximal a first end 40B, and a second fastener hole 40C disposed proximal a second end 40D. The first and second fastener holes 40A and 40C extend from an outer surface 40E of the connecting portion 40 to an inner surface 40F. The outer surface 40E faces in an outboard direction O of the vehicle 10, and the inner surface 40F faces in an inboard direction I of the vehicle. The first fastener hole 40A in the connecting portion 40 of the support bracket 30 is configured to receive a first fastener 46 to movably connect the hinge arm 32 thereto. The second fastener hole 40C in the connecting portion 40 of the support bracket 30 is configured to receive a second fastener 48 to movably connect the hood strut 34 thereto.

The stop tab 36 extends in the inboard direction I from the connecting portion 40, as shown in FIGS. 10-13. The stop tab 36 is disposed proximal the first end 40B of the connecting portion 40. The stop tab 36 extends from an upper edge 40G of the connecting portion 40. As shown in FIG. 10, the stop tab 36 is disposed above the pivot axis A. As shown in FIG. 12, the stop tab 36 is disposed forward of the pivot axis A in a longitudinal direction of the vehicle 10. The stop tab 36 has an upper surface 36A and a lower surface 36B. The stop tab 36 is preferably integrally formed with the support bracket 30 as a one-piece member.

The hinge arm 32 includes a connecting portion 50 and a mounting portion 52, as shown in FIGS. 10-13. The hinge arm 32 is preferably made of a metallic material, such as steel. The hinge arm 32 is preferably unitarily formed as a one-piece member.

The connecting portion 50 is movably connected to the inner surface 40F of the connecting portion 40 of the support bracket 32, as shown in FIGS. 10-13. The first fastener 46 movably connects the connecting portion 50 of the hinge arm 32 to the connecting portion 40 of the support bracket 30.

The connecting portion 50 of the hinge arm 32 includes an upper curved portion 54 and a lower curved portion 56, as shown in FIGS. 10 and 11. The lower curved portion 56 extends rearward of the pivot axis A in the longitudinal direction of the vehicle when viewed in a direction parallel to the pivot axis A when the hinge arm 32 is in the first, or closed, position, as shown in FIGS. 10 and 11. The lower curved portion 56 is substantially continuous from a rearward-most point 56A to a lowermost point 56B of the lower curved portion 56 when the hinge arm 32 is in the first position, as shown in FIG. 10. In other words, the lower curved portion 56 has a substantially continuous edge from the rearward-most point 56A to the lowermost point 56B, thereby providing a hinge arm having increased strength compared to a conventional hinge arm having a discontinuous lower curved portion (e.g., a notch disposed in the lower curved portion).

The connecting portion 50 includes a strengthening rib 58 to strengthen the hinge arm 32. The rib 58 extends from proximate the pivot axis A. or the first fastener 46, to proximate the mounting portion 52, as shown in FIG. 10.

A substantially planar portion 60 of the hinge arm 32 is disposed rearward of the upper curved portion 54, as shown in FIGS. 10 and 11. The substantially planar portion 60 of the hinge arm 32 is configured to engage the stop tab 36 when the hinge arm is in the second, or fully opened, position, as shown in FIG. 4. The substantially planar portion 60 moves through an angle α between the first and second positions, as shown in FIG. 10. Preferably, the substantially planar portion 60 moves through an angle α of approximately 48 degrees when the hinge arm 32 moves from the first position to the second position.

The mounting portion 52 of the hinge arm 32 is disposed at a forward end of the hinge arm, as shown in FIGS. 10-13. The mounting portion 52 is preferably substantially planar. The mounting portion 52 of the hinge arm 32 includes a plurality of fastener holes 52A, as shown in FIGS. 3, 4 and 10-13. The fastener holes 52A extend from an upper surface 52B of the mounting portion 52 to a lower surface 52C of the mounting portion 52. Although the mounting portion 52 is shown having two fastener holes 52A, the mounting portion 52 can have any suitable number of fastener holes 52A. Each fastener hole 52A is configured to receive a fastener 62 to secure the hood 16 to the hinge arm 32 of the hinge assembly 18.

The fender 14 includes a lower surface 14A that faces the stop tab 36, as shown in FIGS. 3, 4 and 8. An adhesive member 66 is disposed between the lower surface 14A of the fender 14 and the stop tab 36. The fender 14 includes a wall 14B that extends downwardly on an inboard side of the stop tab 36 to facilitate positioning the fender 14. An upper portion 14C of the fender 14 is supported by the stop tab 36 of the support bracket 30 of the hinge assembly 18. The wall 14B extends downwardly from an inboard edge of the upper portion 14C of the fender 14.

Figure 7:
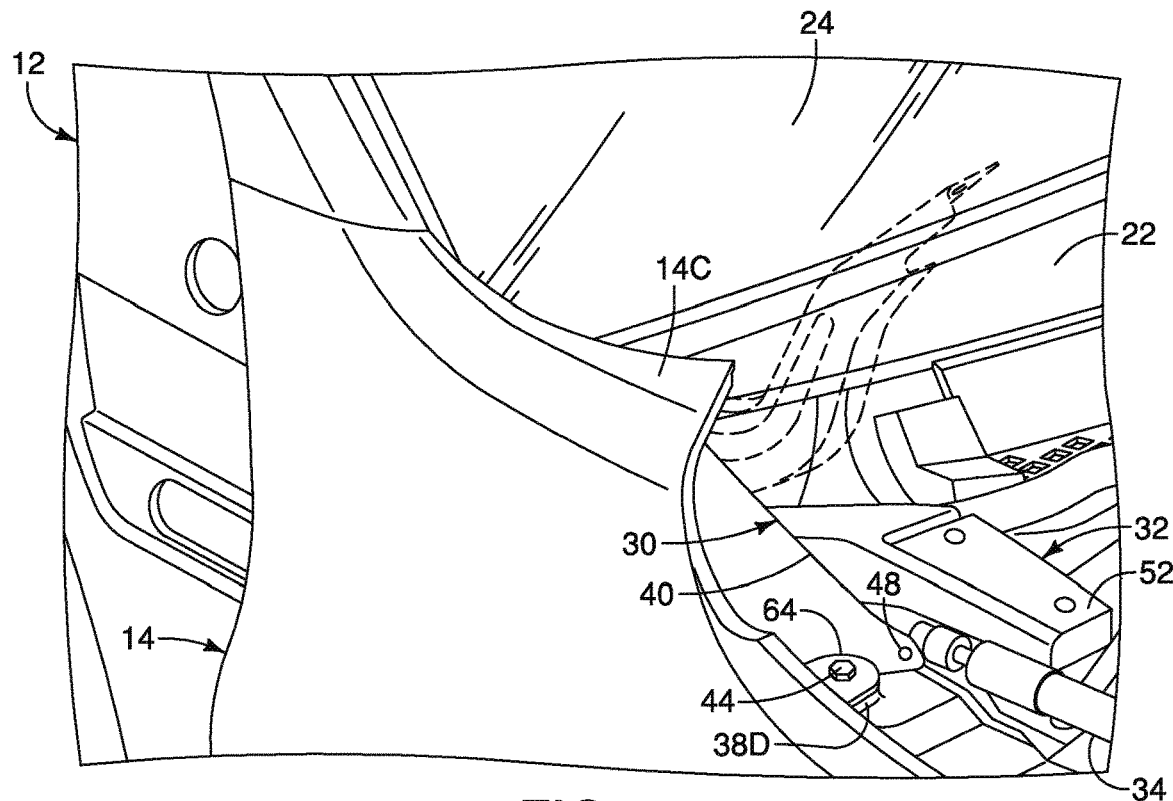
FIG. 7 is a perspective view of a strut connected to a support bracket of the hinge assembly of FIG. 2.

The fender 14 includes a mounting tab 64, as shown in FIGS. 2 and 7. The mounting tab 64 includes a fastener hole to facilitate connecting the support bracket 30 to the fender 14.

A vehicle hood assembly 68, as shown in FIGS. 3 and 4, includes the support bracket 30, the hinge arm 32, the fender 14 and the vehicle hood 16. The hinge arm 32 is movably connected to the support bracket 30 by the first fastener 46. The hood 16 is connected to the 52 of the hinge arm 32 by fasteners 62. The support bracket 30 is connected to the vehicle body structure 12 by fasteners 42 engaging the mounting portion 38 of the support bracket 30 and the vehicle body structure 12, as shown in FIG. 9. A fastener 44 engages the mounting tab 64 of the fender 14 and the mounting tab 38D of the support bracket 30, as shown in FIG. 7, to connect the support bracket 30 to the fender 14. A fastener 48 movably connects the strut 34 to the connecting portion 40 of the support bracket 30, as shown in FIGS. 3 and 7. The support bracket 30 rigidly secures the hinge assembly 18 to the vehicle 10. The hinge arm 32 supports the vehicle hood 16, and facilitates moving the hood 16 between the first and second positions. As shown in FIGS. 2-9, the hinge assembly 18 is disposed on a passenger side of the vehicle 10. A substantially similar hinge assembly 18 is disposed on a driver side of the vehicle 10 to support an opposite side of the hood 16.

The hood 16 is shown in the first, or closed, position in FIG. 3. In the first position, the substantially planar portion 60 of the hinge arm 32 is spaced from the stop tab 36 of the support bracket 30. As shown in FIG. 4, the hood 16 is moved to the second, or fully opened, position. The substantially planar portion 60 of the hinge arm 32 engages the lower surface 36B of the stop tab 36 to prevent movement of the hinge arm 32 beyond the second position.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment (s), the following directional terms "forward", "rearward", "above", "downward", "vertical", "horizontal", "below" and "transverse" as well as any other similar directional terms refer to those directions of a vehicle equipped with the hinge assembly for vehicle hood. Accordingly, these terms, as utilized to describe the present invention should be interpreted relative to a vehicle equipped with the hinge assembly for vehicle hood.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. Thus, the foregoing descriptions of the embodiments according to the present invention are provided for illustration only, and not for the purpose of limiting the invention as defined by the appended claims and their equivalents.

What is claimed is:

1. A hood hinge assembly for a vehicle hood comprising:
a support bracket configured to be fixed to a vehicle body structure;
a hinge arm movably connected to the support bracket, the hinge arm being movable about a pivot axis between a first position in which the vehicle hood is closed and a second position in which the vehicle hood is fully open; and
a stop tab connected to the support bracket, the stop tab preventing movement of the hinge arm beyond the second position, an entirety of the stop tab being disposed forward of the pivot axis in a longitudinal direction of the vehicle, the stop tab supporting a fender connected to the vehicle body structure and being configured such that the fender overlies the stop tab when the hinge arm is in the first position.

2. The hood hinge assembly according to claim 1, wherein the stop tab is disposed above the pivot axis.

3. The hood hinge assembly according to claim 1, wherein the hinge arm has an upper curved portion and a lower curved portion, the lower curved portion extending rearward of the pivot axis in a longitudinal direction of the vehicle when viewed in a direction parallel to the pivot axis when the hinge arm is in the first position.

4. The hood hinge assembly according to claim 3, wherein the lower curved portion is substantially continuous from a rearward-most point to a lowermost point of the lower curved portion when the hinge arm is in the first position.

5. The hood hinge assembly according to claim 3, wherein the hinge arm includes a substantially planar portion configured to engage the stop tab when the hinge arm is in the second position.

6. The hood hinge assembly according to claim 5, wherein the substantially planar portion is disposed rearward of the upper curved portion.

7. The hood hinge assembly according to claim 6, wherein the substantially planar portion moves through an angle of approximately 48 degrees when the hinge arm moves from the first position to the second position.

8. The hood hinge assembly according to claim 1, wherein the stop tab is integrally formed with the support bracket as a one-piece member.

9. The hood hinge assembly according to claim 1, wherein the hinge arm includes a rib extending from the pivot axis to a mounting portion, the mounting portion being configured to be connected to the vehicle hood.

10. The hood hinge assembly according to claim 1 wherein an adhesive member is connected to the stop tab, the adhesive member being configured to be disposed between the stop tab and the fender.

11. A vehicle hood assembly comprising:
a vehicle hood;
a support bracket configured to be fixed to a vehicle body structure;
a hinge arm having a connecting portion movably connected to the support bracket and a mounting portion connected to the vehicle hood, the hinge arm being movable about a pivot axis between a first position in which the vehicle hood is closed and a second position in which the vehicle hood is fully open;
a stop tab connected to the support bracket, the stop tab preventing movement of the hinge arm beyond the second position, the stop tab being disposed forward of the pivot axis in a longitudinal direction; and
a fender supported by the stop tab, the fender overlying the stop tab.

12. The hood hinge assembly according to claim 11, wherein
the stop tab is disposed forward of the pivot axis in a longitudinal direction of the vehicle.

13. The hood hinge assembly according to claim 11, wherein
the hinge arm has an upper curved portion and a lower curved portion, the lower curved portion extending rearward of the pivot axis in a longitudinal direction of the vehicle when viewed in a direction parallel to the pivot axis when the hinge arm is in the first position.

14. The hood hinge assembly according to claim 13, wherein
the lower curved portion is substantially continuous from a rearward-most point to a lowermost point of the lower curved portion when the hinge arm is in the first position.

15. The hood hinge assembly according to claim 13, wherein
the hinge arm includes a substantially planar portion configured to engage the stop tab when the hinge arm is in the second position.

16. The hood hinge assembly according to claim 15, wherein
the substantially planar portion is disposed rearward of the upper curved portion.

17. The hood hinge assembly according to claim 11 wherein
the hinge arm includes a rib extending from the pivot axis to a mounting portion, the mounting portion being configured to be connected to the vehicle hood.

18. The hood hinge assembly according to claim 11 wherein
an adhesive member is disposed between the stop tab and the fender.

19. The hood hinge assembly according to claim 11 wherein
the fender includes an upper portion supported by the stop tab, a wall extending downwardly from the upper portion of the fender on an inboard side of the stop tab.

20. The hood hinge assembly according to claim 11 wherein
the stop tab is integrally formed with the support bracket as a one-piece member.

* * * * *